United States Patent [19]

Cattaneo

[11] Patent Number: 5,292,095
[45] Date of Patent: Mar. 8, 1994

[54] LEVELLING DEVICE, PARTICULARLY FOR FURNITURE

[75] Inventor: Carlo Cattaneo, Figino Serenza, Italy
[73] Assignee: Camar S.p.A., Figino Serenza, Italy
[21] Appl. No.: 842,036
[22] Filed: Feb. 25, 1992
[30] Foreign Application Priority Data Feb. 26, 1991 [IT] Italy .................. MI91A000484

[51] Int. Cl.⁵ ........................................... F16M 11/00
[52] U.S. Cl. ........................... 248/188.4; 248/650
[58] Field of Search ............... 248/188.4, 650, 188.2, 248/688, 354.3, 405, 157; 108/147

[56] References Cited

U.S. PATENT DOCUMENTS 106,317  8/1870  Bull ................................ 248/188.4
1,387,390  8/1921  Haggenmiller ................... 248/188.4
1,417,639  5/1922  Sterner .............................. 248/188.4

FOREIGN PATENT DOCUMENTS 0380773  8/1990  European Pat. Off. ......... 248/188.4

Primary Examiner—Karen J. Chotkowski
Attorney, Agent, or Firm—Hedman, Gibson & Costigan

[57] ABSTRACT

A furniture levelling device comprises a foot height-adjustable by an adjustment mechanism of lead-screw and nut-screw type housed in a seat provided in a part of the furniture item and operable from the interior of the furniture item. The adjustment mechanism is operationally connected to a remote control device operable from the interior of the furniture item.

6 Claims, 6 Drawing Sheets

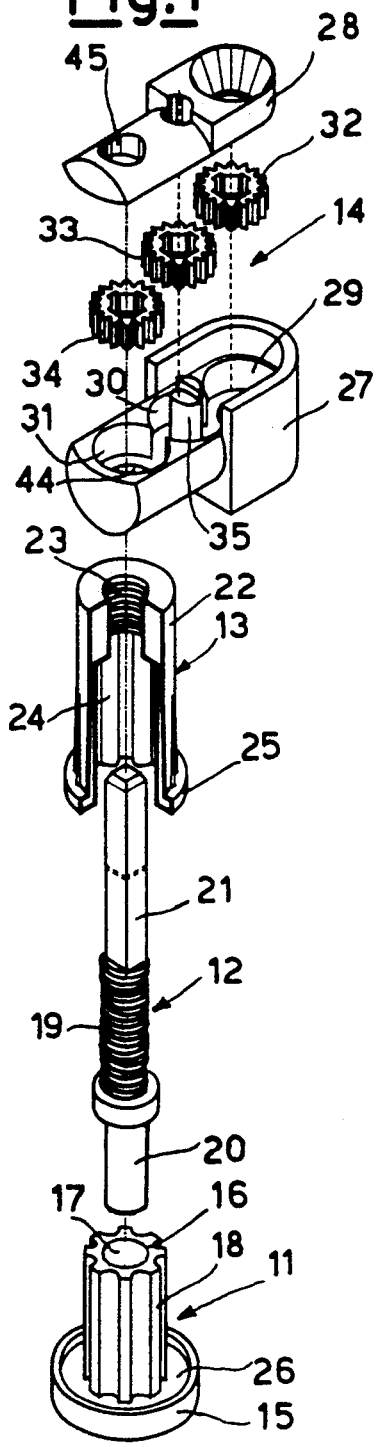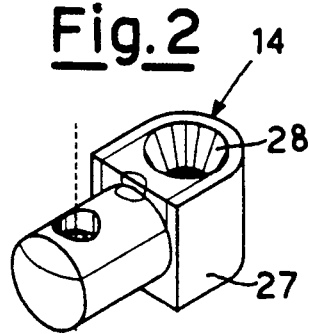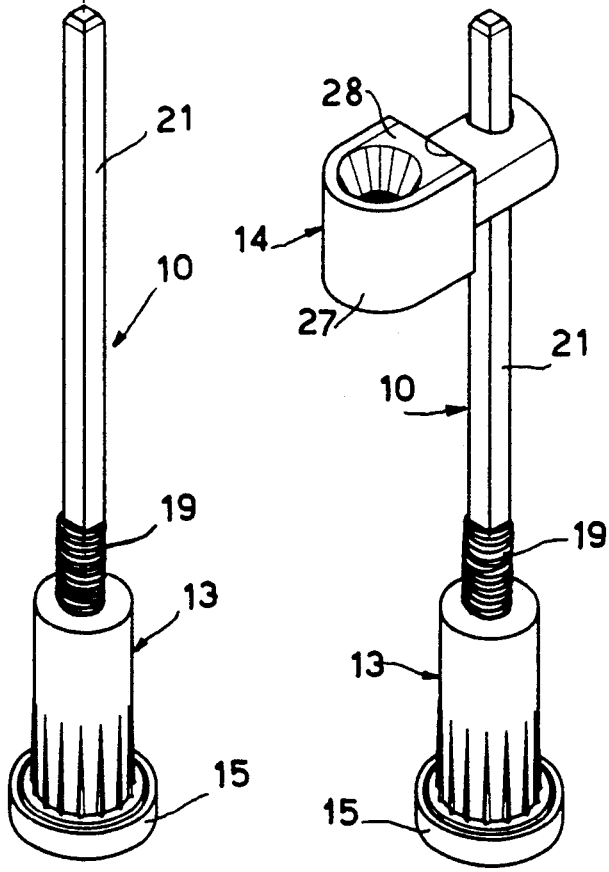

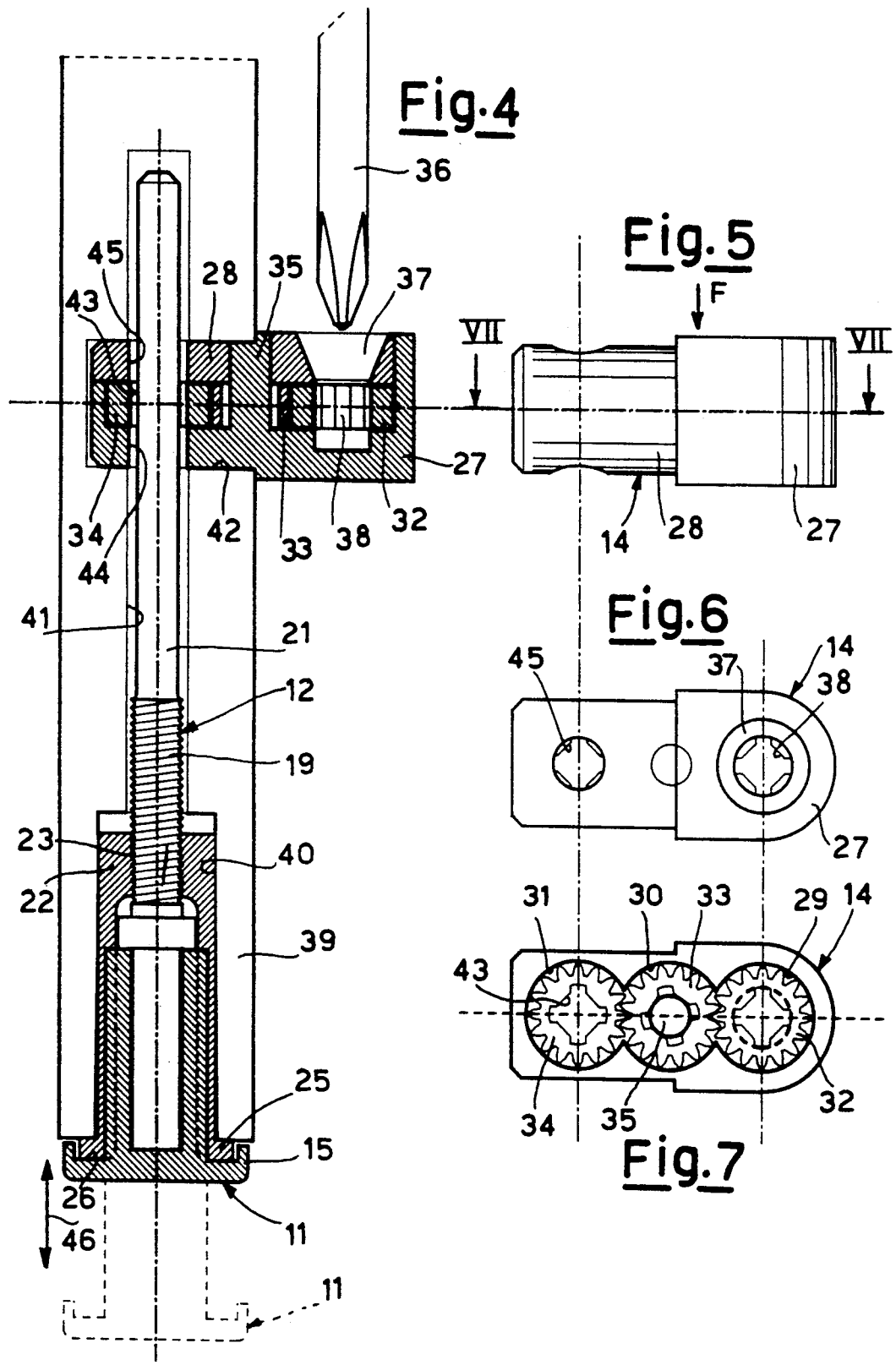

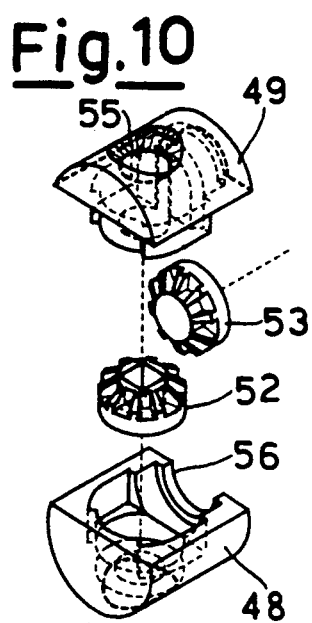
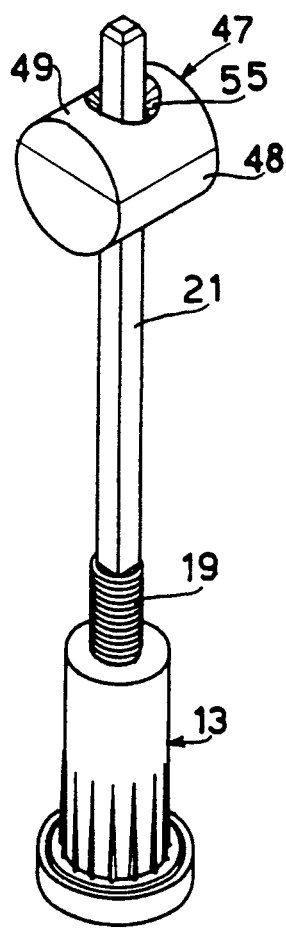
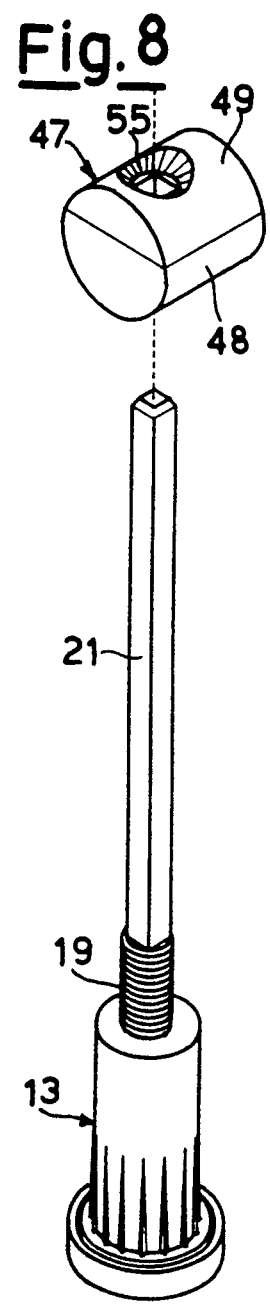

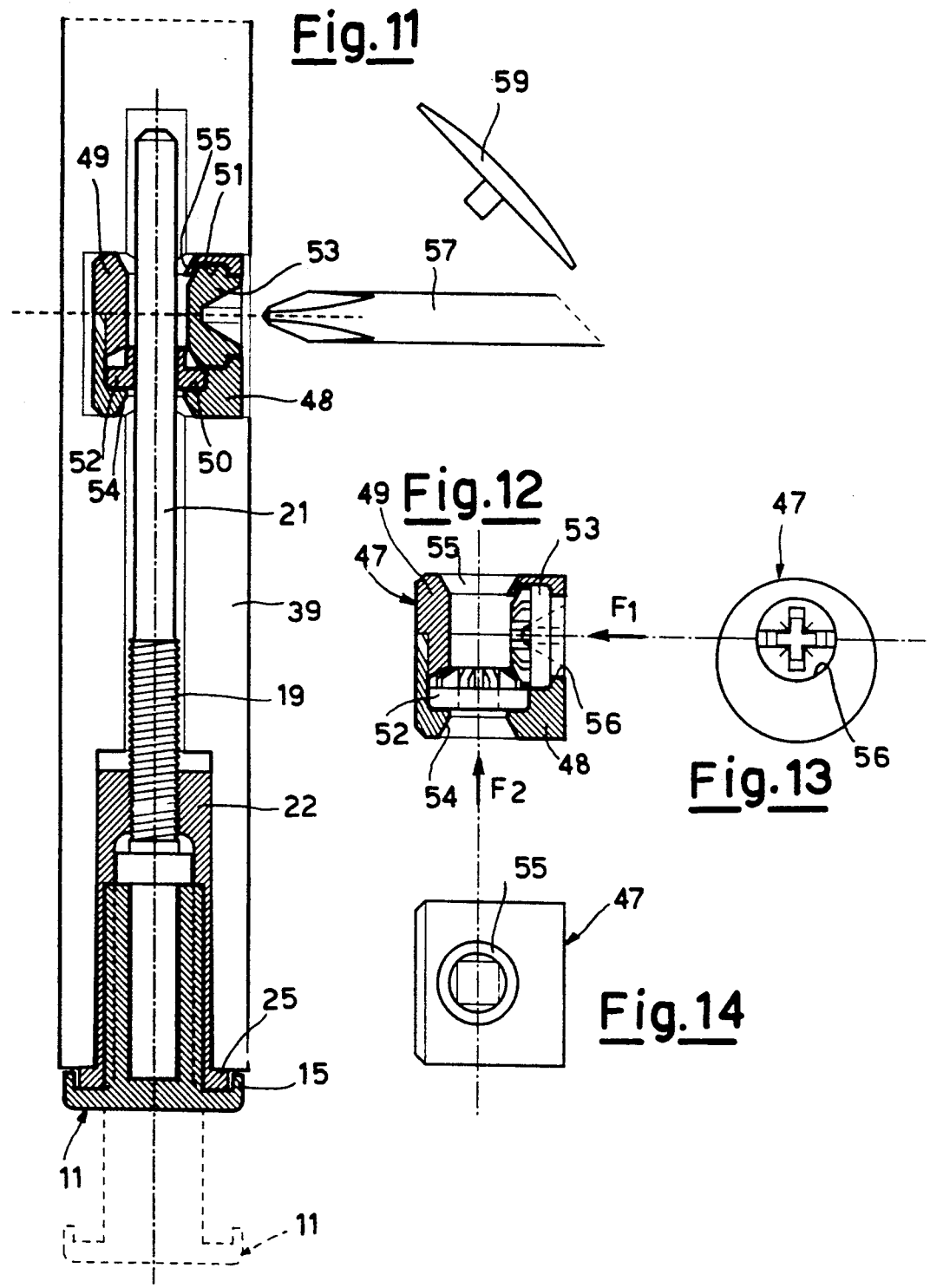

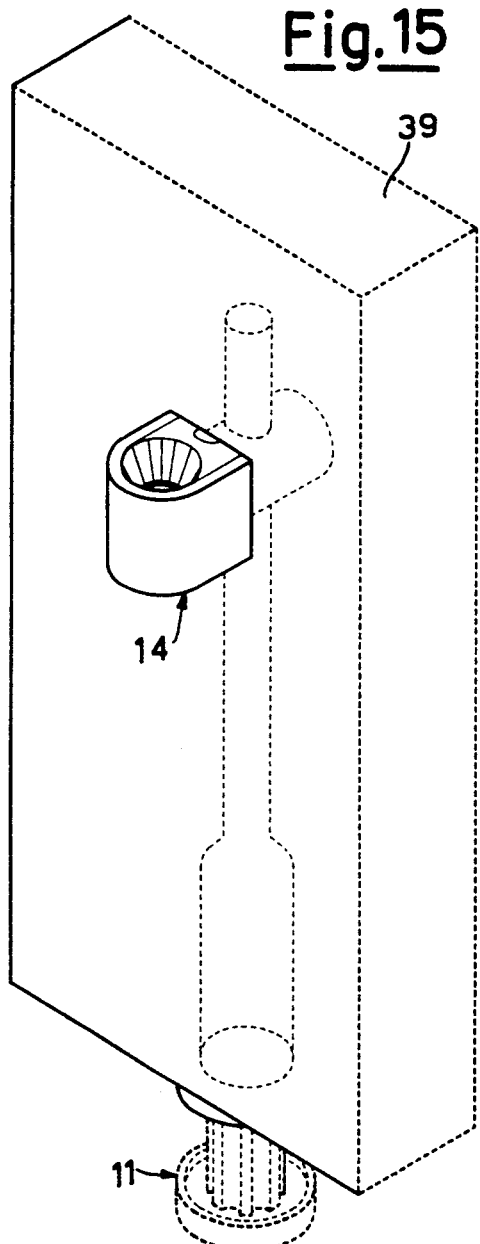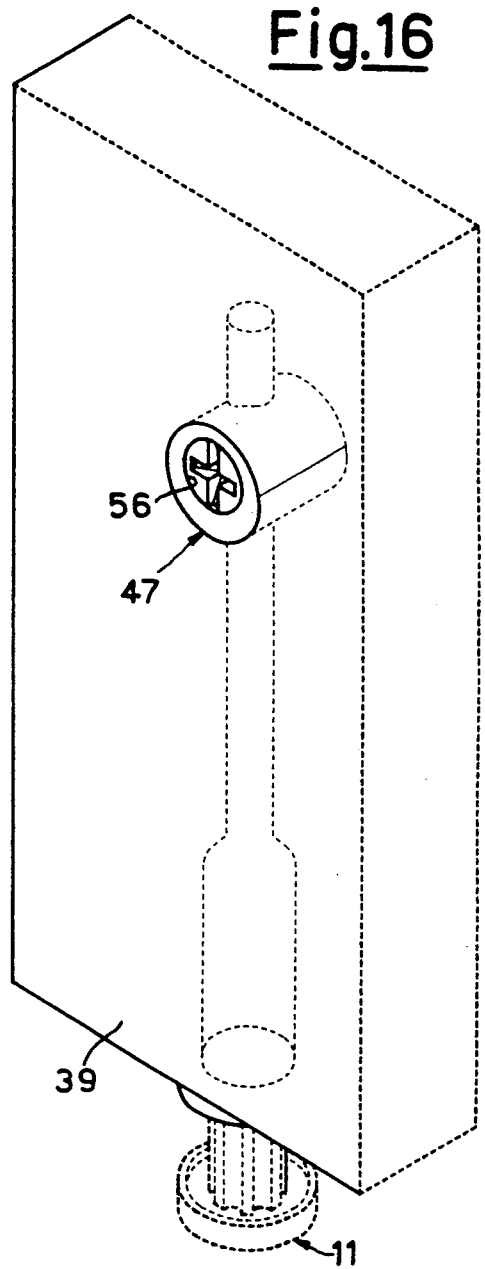

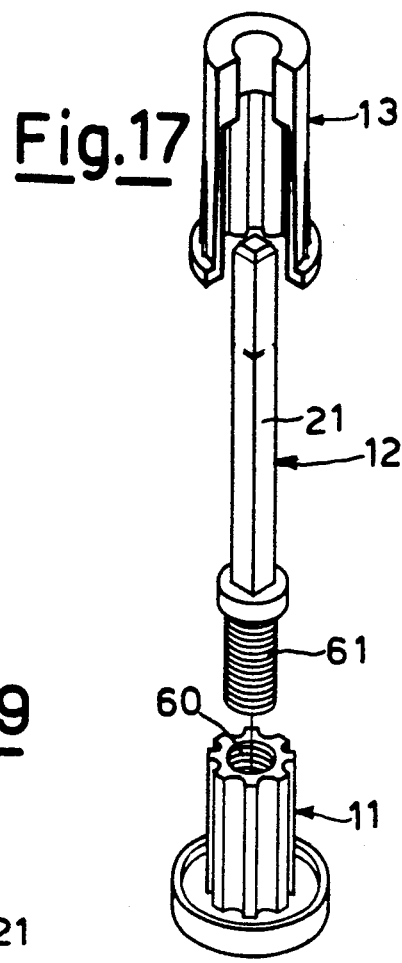
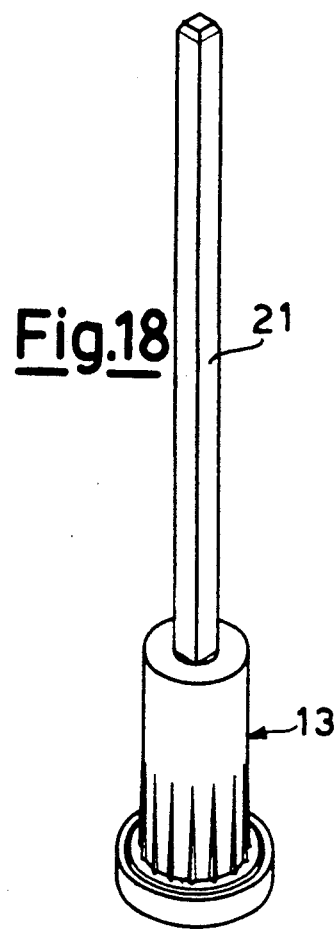
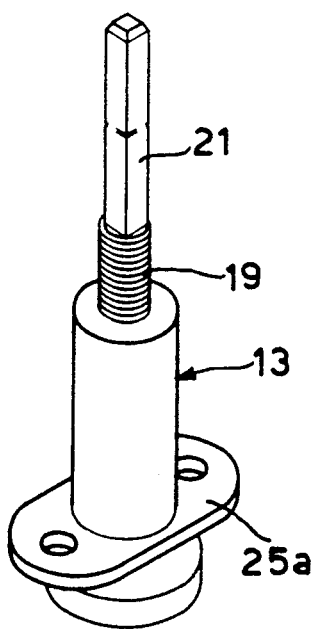
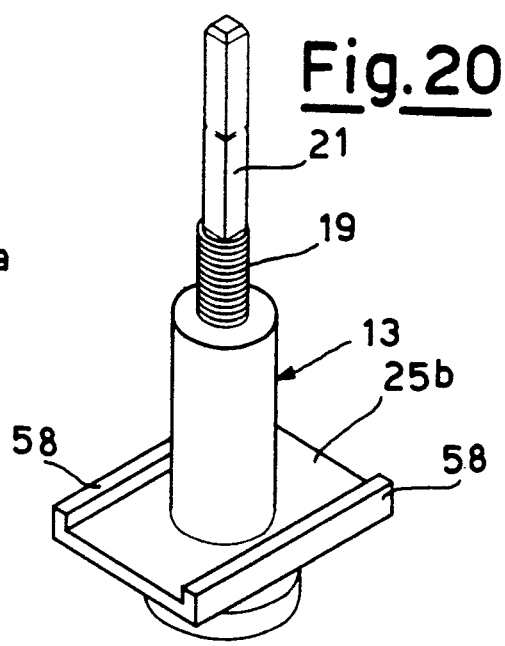

LEVELLING DEVICE, PARTICULARLY FOR FURNITURE

This invention relates to a levelling device particularly suitable for stably positioning an item of furniture vertically on a support surface, such as a floor.

The levelling device of the invention is of the type inserted into a part of the furniture item, such as a side, a plinth or a leg. A device of this type is described for example in the industrial invention patent application No. 20238 A/89 filed in Italy on Apr. 21, 1989 in the name of Fiorello Giovanetti.

The levelling device of patent application 20238 A/89 is formed structurally from the combination of a base element or foot with a threaded shank rigid therewith, a sleeve-type operating element provided with axial end toothing and engaged the threaded shank of the foot, and a jacket-type support element which houses the operating element. The parts are interconnected such that when the sleeve-type operating element is rotated by a screwdriver, it causes the base element or foot to move axially.

Although such a levelling device operates satisfactorily, it has some drawbacks which can be summarized as follows.

The transfer of movement via the intermediate sleeve rotating within a jacket is not smooth, but instead is rather fatiguing especially if the item of furniture is not empty.

To be able to engaged by the end of the screwdriver, the sleeve-type operating element must comprises a certain number of teeth, which determine its diameter, with the result that the entire levelling device may be bulky and hence unsuitable for incorporating into the usual thickness of the side of a furniture item.

The threaded shank of the foot easily escapes from the operating sleeve.

The size of the crosshead screwdriver must be very precise, and the sleeve element can be operated only by maintaining the screwdriver perfectly perpendicular to the levelling device. The panel hole which is to house the levelling device must be very precise, i.e. the seat for the levelling device and the hole through which the operating screwdriver enters must be positioned accurately relative to the panel base, otherwise there is the risk of the end of the crosshead screwdriver not correctly engaging the toothing on the operating sleeve.

A further drawback is that if the foot incorporating the threaded shank is caused to rotate, for example by the assembled furniture item being moved (dragged), the screwdriver hole and the toothing on the operating sleeve may be shifted out of alignment, so making it impossible to use the levelling device.

It is difficult to operate when the foot is subjected to load, because the linkage system within the levelling device is not of precision type.

The weight of the furniture item acts totally on the top of the mechanism jacket on which the end of the mechanism seat rests, and where the chipboard is most weak.

The levelling device is operated using a crosshead screwdriver not in the proper manner, and a certain practice is necessary to engage the teeth on the operating sleeve.

The object of the invention is to obviate the aforesaid drawbacks by providing a levelling device which can be easily and quickly fitted to the furniture item, and is of reliable and smooth operation.

This object is attained according to the invention by a furniture levelling device of the type comprising a foot height-adjustable by means of an adjustment mechanism of lead-screw and nut-screw type housed in a seat provided in a part of the furniture item and operable from the interior of the furniture item, characterised in that said adjustment mechanism is operationally connected to a remote control device operable from the interior of the furniture item.

Preferably said control device is a gearbox the gears of which are operable by a screwdriver and operationally connected to said lead-screw.

The structural and operational characteristics of the invention and its advantages over the known art will be more apparent from an examination of the following description given with reference to the accompanying drawings, which show some embodiments of the invention.

In the drawings:

FIG. 1 is a partly cut-away completely exploded perspective view with the control device open, showing a first embodiment of the invention;

FIG. 2 is a partly exploded perspective view of the levelling device of FIG. 1 with the control device closed and with the lead-screw, nut-screw and foot fitted together;

FIG. 3 is a perspective view showing the levelling device of FIGS. 1 and 2 but with the control device coupled to the lead-screw;

FIG. 4 is an enlarged vertical section showing the levelling device of FIGS. 1-3 mounted in its operating state within a panel of a furniture item;

FIG. 5 is an elevational view of the control device;

FIG. 6 is a plan view in the direction of the arrow F of FIG. 5;

FIG. 7 is a section on the line VII—VII of FIG. 5;

FIG. 8 is an exploded perspective view of a second embodiment of the levelling device according to the invention;

FIG. 9 is a perspective view of the levelling device of FIG. 8 but with the control device coupled to the lead-screw;

FIG. 10 is an exploded perspective view of the control device;

FIG. 11 is an enlarged vertical section showing the levelling device of FIGS. 8 and 9 mounted in its operating state within a panel of a furniture item;

FIG. 12 is a section through the control device;

FIG. 13 is a view in the direction of the arrow F1 of FIG. 12;

FIG. 14 is a view in the direction of the arrow F2 of FIG. 12;

FIG. 15 is a perspective view showing the levelling device of FIGS. 1-7 mounted in its operating state within a panel of a furniture item;

FIG. 16 is a perspective view showing the levelling device of

FIGS. 8-14 mounted in its operating state within a panel of a furniture item;

FIGS. 17 and 18 show a third embodiment of the device according to the invention; and FIGS. 19 and 20 show two further possible embodiments of the mechanism nut-screw.

With reference firstly to FIGS. 1-3 of the drawings, the levelling device, in a first embodiment of the invention, is indicated overall by 10 and is composed structurally of four pieces, namely a foot 11, a lead-screw 12, a nut-screw 13 and a control device 14 (FIG. 1).

The foot 11 comprises a base 15, for example circular, from which there extends a cylindrical column 16 holed axially at 17 and externally comprising longitudinal ribs 18.

The lead-screw 12 comprises a threaded intermediate portion 19, from the opposing ends of which there respectively extend a cylindrical stem 20 which is freely inserted into the hole 17 of the foot 11, and an extension 21 of polygonal cross-section (square in the example) which is engaged with the control device 14 (FIG. 3) in the manner explained hereinafter.

The nut-screw 13 consists of a sleeve 22 partially threaded internally at 23 and partially ribbed at 24. As can be clearly seen from FIG. 4 of the drawings, the sleeve 22 is coupled via its threaded portion 23 to the threaded portion 19 of the lead-screw 12 and via its ribbed portion 24 to the corresponding ribbed portion 18 of the foot 11. In addition, the sleeve 22 is provided at one end with an annular flange 25 which is housed in an annular seat 26 of the base 15 of the foot 11, and reacts against a part 39 of a furniture item, such as the base of a shoulder or side. The flange 25 can be of other than annular shape, as shown in FIGS. 19 and 20.

FIG. 19 shows a flange 25a provided with holes by which it is fixed by screws to the part of the furniture item, whereas FIG. 20 shows a flange 25b provided with lateral ribs 58 for embracing the base of the panel of the furniture item.

The control device 14 consists of a gearbox comprising two connected half-boxes 27 and 28, and rotatably housing three identical gears 32, 33 and 34 in respective profiled seats 29, 30 and 31. As can be clearly seen from FIGS. 1, 4 and 7 of the drawings, the intermediate gear 33 is mounted on a pin 35 formed integrally with the half-box 27, while the end gears 32 and 34 are mounted freely rotatable within their respective seats 29, 31. The gear 34 is coupled to and rotatably rigid with the extension 21 of the lead-screw 19, whereas the gear 32 can be rotated by a screwdriver 36 inserted through a flared hole 37 in the half-box 28 (FIG. 4) to engage a correspondingly shaped hole 38 in the gear 32. The intermediate gear 33 is idle.

The levelling device of the invention as heretofore described with reference to FIGS. 1 to 7 is intended to be mounted in a part of a furniture item, such as a shoulder or panel 39, as is clearly shown in FIGS. 4 to 15.

More specifically, the panel 39 comprises two aligned holes 40, 41 of greater and lesser diameter respectively, the hole 41 being intersected by a transverse hole 42, all housing the levelling device 10 in the manner clearly shown in the drawings. For assembly, the control device 14 is firstly partly inserted into the hole 42, after which the assembled unit comprising the foot 11, lead-screw 12 and nut-screw 13 is inserted into the holes 40, 41 so that the extension 21 passes through the gear 34, which comprises a corresponding hole 43.

To enable this, the half-boxes 27, 28 also comprise corresponding holes 44 and 45.

A portion of the control device 14 remains external to the panel to enable the gear 32 to be rotated by a screwdriver 36 held parallel to the panel 39, as shown in FIG. 4 of the drawings. It is apparent that rotating the gear 32 induces a corresponding rotation of the gear 34 associated with the lead-screw 19 and nut-screw 13, with a corresponding axial movement of the foot 11 in the direction of the arrow 46, as indicated by dashed lines in FIGS. 4 and 15 of the drawings.

FIGS. 8-14 of the drawings show a further possible embodiment of the invention, in which the unit comprising the foot 11, lead-screw 12 and nut-screw 13 is perfectly identical to that shown in FIGS. 1-7 of the drawings, and for this reason carries the same reference numerals, whereas the control device is different and is indicated overall by 47.

The control device 47 comprises a gearbox formed structurally from two half-boxes 48, 49 connected together.

Said two half-boxes 48, 49 are provided internally with respective profiled seats 50, 51 housing 90° -engaged gears 52, 53. The gear 52 is coupled to the shank 21 which passes through holes 54, 55 provided in the half-boxes 48, 49 respectively, whereas the gear 53 can be engaged, for its rotation, by a screwdriver 57 via a hole 56 provided partly in the half-box 48 and partly in the half-box 49.

As can be clearly seen from FIGS. 11 and 16 of the drawings, this levelling device is completely housed within the panel 39 and is operated with the screwdriver 57 held perpendicular to the panel 39.

The reference numeral 59 (FIG. 11) indicates a plug for covering the hole through which the screwdriver is inserted.

The advantages of the levelling device of the invention can be summarised as follows.

The gearbox which forms the control device can comprise three identical gears, and is hence of economical production. The distance between the seat of the control device and the base of the furniture item is not fixed, so that said seat can be provided in any desired position, depending on the position and shape of the base panel of the furniture item.

The operating force of the levelling device can be reduced to a minimum by suitably choosing the diameters of the gears of the control device.

The operating screwdriver engages precisely with the control device and requires no expertise by the user.

The levelling device can be operated by either a crosshead or straight head screwdriver.

Modifications can be made to the levelling device, all of which fall within the range of protection defined by the accompanying claims.

For example, as shown in FIGS. 17 and 18, the hole 17 of the foot 11 can be threaded as at 60, to itself form the nut-screw of the mechanism. Hence the thread 23 is no longer required on the piece 13, and the corresponding end part of the lead-screw 12, threaded at 61, is screwed into the thread 60.

I claim:

1. A furniture levelling device for positioning an item of furniture vertically on a support surface which comprises a foot which is height-adjustable by means of an adjustment mechanism comprising a lead-screw and nut-screw housed in a seat provided in a part of said item of furniture, said adjustment mechanism being operationally connected to a remote control gearbox which is operable from the interior of said furniture item, said lead-screw comprising an intermediate portion which is threaded and engages said nut-screw, said lead-screw having on one end a cylindrical stem which is inserted into said foot of said device and on the opposite end a shank having a polygonal cross sectional which is adapted to engage said gearbox.

2. A levelling device as claimed in claim 1, wherein the gears of said gearbox are operable by a screwdriver and are operationally connected to said lead-screw.

3. A levelling device as claimed in claim 2, characterised in that said gearbox extends partly into the interior of said seat and partly into the interior of the furniture item.

4. A levelling device as claimed in claim 2, characterised in that said gearbox comprises two connected half-boxed within which profiled seats are provided for said gears.

5. A levelling device as claimed in claim 2, characterised in that said gearbox comprises two 90°-engaging gears contained entirely within the seat provided in the part of the furniture item, a first gear being coupled to said shank and the second gear being operable by a screwdriver from the interior of the furniture item.

6. A leveling device for positioning an item of furniture vertically on a support surface which comprises a foot which is height adjustable by means of an adjustment mechanism comprising a lead-screw having a shank extending from one end and a nut-screw housed in a seat provided in a part of said item of furniture, said adjustment mechanism being operationally connected to a remote control gearbox which is operable by a screwdriver from the interior of said furniture item, said gearbox comprising three gears, namely a first gear coupled to said shank within the seat provided in the part of the furniture item, a second gear external to said seat which is operable by a screwdriver from the inside of the furniture item, and a third gear intermediate to the first two.

* * * * *